United States Patent [19]

Peterson et al.

[11] 4,064,359

[45] Dec. 20, 1977

[54] FIRE RETARDANT PRODUCT FOR USE WITH ELECTRICAL CABLES AND THE LIKE

[75] Inventors: Roger L. Peterson, Los Angeles; George M. Joyce, Santa Monica, both of Calif.

[73] Assignee: Flamemaster Corporation, Sun Valley, Calif.

[21] Appl. No.: 687,345

[22] Filed: May 19, 1976

Related U.S. Application Data

[63] Continuation-in-part of Ser. No. 400,054, Sept. 24, 1973, abandoned.

[51] Int. Cl.² .................. H01B 7/28; B32B 17/02
[52] U.S. Cl. ................... 174/107; 174/68 C; 174/121 A; 428/215; 428/228; 428/268; 428/297; 428/337; 428/433; 428/920; 428/921
[58] Field of Search ........ 174/120 C, 120 SR, 121 A, 174/122 G, 68 R, 68 A, 68 C, 107; 428/228, 250, 268, 271, 285, 290, 297, 337, 339, 920, 921, 215, 432, 433

[56] References Cited

U.S. PATENT DOCUMENTS

| | | | |
|---|---|---|---|
| 2,938,937 | 5/1960 | Shenk | 260/738 |
| 3,212,925 | 10/1965 | Rosenthal et al. | 428/921 |
| 3,464,543 | 9/1969 | Kwiatonowski et al. | 428/921 |
| 3,576,940 | 5/1971 | Stone | 427/119 |
| 3,642,531 | 2/1972 | Peterson | 428/382 |
| 3,647,606 | 3/1972 | Notaro | 428/285 |
| 3,694,304 | 9/1972 | Palumbo | 428/361 |
| 3,772,455 | 11/1973 | Nicodemus et al. | 171/121 SR |
| 3,821,063 | 6/1974 | D'Olier | 428/293 |
| 3,928,210 | 12/1975 | Peterson | 428/290 |

*Primary Examiner*—William R. Dixon, Jr.
*Attorney, Agent, or Firm*—Lyon & Lyon

[57] ABSTRACT

A fire protective insulating product which, when placed about electrical cables, cable trays or conduits, is capable of protecting the cable or pipe from exposure to open flame temperatures of 1600° to 2000° F. The product comprises a first layer containing insulative, inorganic non-combustible fibers, and a coating thereon comprising 1.5 to 20% organically bound halogen, 3 to 75% high temperature resistant non-combustible fiber, and 5 to 75% resinous binder.

16 Claims, 5 Drawing Figures

FIRE RETARDANT PRODUCT FOR USE WITH ELECTRICAL CABLES AND THE LIKE

This application is a continuation-in-part of our pending application Ser. No. 400,054, filed Sept. 24, 1973, now abandoned, entitled "FIRE RETARDANCE PRODUCTS FOR USE WITH ELECTRICAL CABLES AND THE LIKE, now abandoned."

BACKGROUND OF THE INVENTION

The need for means of fireproofing electrical conductors, conduits or pipes so they will withstand high temperature fires (on the order of 1600 to 2000° F.) for extended periods of time has become apparent in many industries. One industry where such high temperature protection is sought is the petroleum industry. Because of the high flammability of products being stored and transported, protection against high temperature petroleum flash fires for extended periods of time is essential. It is necessary that the piping and electrical systems, which may be connected throughout an entire plant, not ignite thereby spreading the first throughout the plant. Rather, pipes and cables must be made to withstand high temperature fires for such times, on the order of 15 to 20 minutes or more, so that the fire may be contained to maintain the system functional when fire occurs to permit an orderly shutdown to isolate the system and/or the fire to be extinguished with a minimum of detriment to the system.

The use of typical non-flammable plastic cable insulation such as polyvinyl chloride (PVC), neoprene or chlorinated polyethylene cannot withstand such high temperature fires for extended periods of time. When such cables are exposed to a fire, the insulation decomposes and the chlorine content is freed and combines with the humidity of the air or water which has been used for fire extinguishing to form hydrochloric acid, which can penetrate concrete foundations and attack steel reinforcement. However, because of the excellent electrical properties, ready availability and cost of such products as PVC, it is desirable to use them for electrical insulation and piping.

The electrical wiring system for many industrial plants utilizes a cable tray into which a plurality of cables are placed. Such a tray increases the fire hazard over the alternative system of encasing the cables in metal conduits. In the tray system, the cables are simply laid on suspended trays throughout the plant. The tray system thus facilitates installation and repair of the cables since they do not have to be pulled through a conduit as in the alternative method. However, in the tray, the fire hazard is increased because of the number of cables set side by side as well as the combustible debris which may collect in the suspended trays.

The piping system in many chemical plants must be geared to handle corrosive and flammable fluids. Because of the corrosion resistant nature of plastic pipes such as PVC, they have found wide application for the pumping and storing of corrosive fluids. Where such piping is used in plants such as petroleum refineries or in the chemical industry to transport corrosive fluids, it is essential that the pipe be able to withstand high temperature flash fires on the order of 1600° to 2000° F.

Simple and efficient means of protecting cables and pipes from high temperature fires for extended periods of time have not been altogether successful. Where the cable or pipe is wrapped or coated and exposed to the harsh environment of a chemical plant or to outdoor weathering, asbestos wrappings and iteumescent coatings have been found to deteriorate and lose their fire protective ability. Glass fibers when used for such applications, have generally demonstrated a higher strength and durability over the asbestos counterpart. However, since many glass fibers melt at approximately 1000° F, they are not suitable protection against the high temperature flash fires which may occur in a petroleum refining plant.

Incorporation of high temperature fibers such as asbestos, into a durable and weather-resistanct coating such as described in U.S. Pat. No. 3,642,531 has given significant success in protecting against fire propagation. However, at temperatures of approximately 1600° to 2000° F, generally about 2 to 5 is required for the cable to reach a 200° F critical temperature when coated with such an asbestos filled, organic coating. However, to allow adequate time for plant shutdown and isolation of the fire, times on the order of 15 minutes to 20 minutes or more are desired.

Other schemes proposed for protecting cables for extended periods against high temperature fires have generally called for multiple layers for protection. For example, the prior art has taught a 4-layer scheme which includes silicone rubber, glass cloth, and asbestos for the high temperature protection of an insulated conductor.

It is thus an object of this invention to provide a fire protective insulating product capable of protecting cables, conduits and pipes from 1600° to 2000° F flames for time periods of greater than 15 minutes.

It is yet another object of this invention to provide a fire protective insulating product which is easier to manufacture and simpler to apply than the products of the prior art.

It is still another obejct of this invention to provide a fire protective insulating product which will exhibit good durability and weatherability.

It is finally another object of this invention to provide a high temperature fire protective insulating product, which, when encasing the conduit to be protected, adds a minimum amount of thickness to the overall system.

SUMMARY OF THE INVENTION

These and other objects are accomplished by providing a fire protective insulating product having a first layer which contains heat insulative high temperature resistant non-combustible fibers with a coating bonded thereto which comprises about 1.5 to 20 weight percent of organically bound halogen, about 5 75% of high temperature resistant noncombustible fibers, and about 5 to 75% of a resinous binder.

DESCRIPTION OF THE PREFERRED EMBODIMENT

Figure 1:
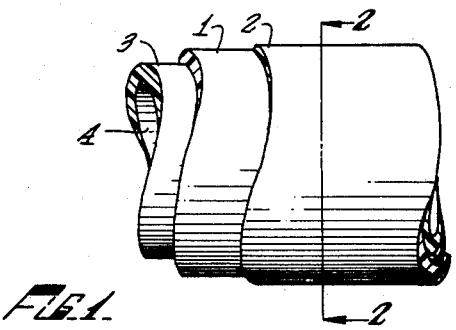
FIG. 1 is a fragmentary perspective view of an insulated electrical cable having wrapped thereabout the fire protective product of this invention.
Figure 2:
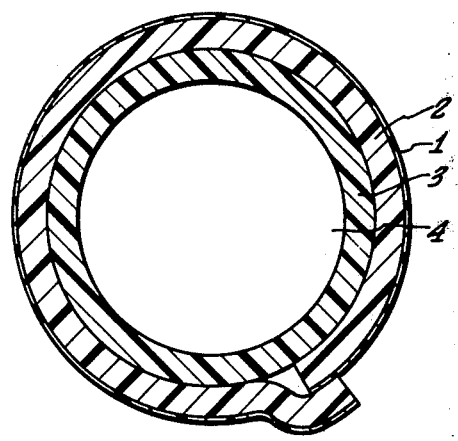
FIG. 2 is a cross section view take on line 2—2 of FIG. 1.

Referring to FIGS. 1 and 2, the fire protective product of this invention, comprising an outer or first layer, 1 and an inner or second layer, 2 is shown wrapped about a conduit, 3. The conduit 3 may be electrical insulation such as PVC in which case 4 will be an electrical conductor. Alternatively, 3 may be a metallic electrical conduit containing an electrical cable or piping such as metallic or right PVC pipe through which corrosive or flammable fluids may flow.

Figure 3:
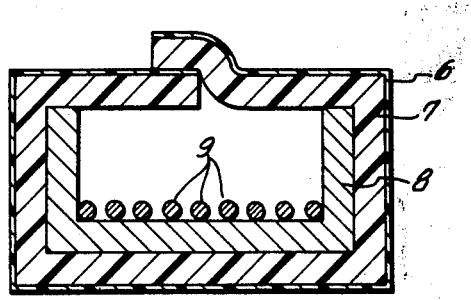
FIG. 3 is a cross sectional view of an electrical cable tray having the fire protective product of this invention applied thereabout.

Referring to FIG. 3, the fire protective product of this invention, having coating 6 and an inner layer 7 is wrapped about a cable tray 8 having a plurality of conductors 9 running through it. For maximum fire protection, the cables, individually or collectively, may be wrapped with the fire protective product as well as the tray containing the plurality of such conductors. Also a double wrap of the fire protective product may be utilized to insure complete coverage of the cable, pipe, or tray.

The inner layer of the first protective product is preferably glass fibers in the form of a fleixible blanket of approximatly $\frac{1}{2}$ to about one inch think. Such blankets are available, for example, from Pittsburg Corning Corporation under the designation "Temp-Mat", which is needled fibrous mat meeting Military Specifications MIL-1-16411D, Type 11. To facilitate securing the fire protective product onto the pipe or cable, a pressure sensitive adhesive suitable for use in the manufacture of pressure sensitive tapes may be coated onto one surface of the glass fiber layer. Referring again to FIG. 2, the surface to be adhesive coated is that surface of layer 2 in contract with conduit 3.

Where specific shapes are to be encased, the fiberglass layer may take the form of a molded fiberglass part. Although maximum fire protective properties are obtained when the inner layer is made up entirely of glass, mixing of the glass with a suitable molding resin to form specific shapes also give acceptable results.

Coated onto the glass layer is a fire protective coating, such as the water based coatings described in the copending Ser. No. 510,887, filed Oct. 1, 1974, now U.S. Pat. No. 3,928,210 , continuation of application, Ser. No. 218,237 of Roger L. Peterson, entitled "Fire Protective Composition for Use With Electrical Cables", filed Jan. 17, 1972, now abandoned, and herein incorporated by reference. Also, solvent based coatings such as those described in U.S. Pat. No. 2,938,937 may be used. The dried coating, which forms the outer layer of the fire retardant product of this invention contains from about 3 to 75 weight per cent of high temperature resistent non-combustible fibers. Preferably, about 20% to 40% of asbestos fibers in the dried coating has been found to give excellent high temperature resistance for extended periods. Other high temperature resistant inorganic fibers such as aluminumsilica refractory fibers, carbon, quartz, or talc, and high temperature resistant organic fibers such as nylon or phenolic fibers available from E. I. duPont de Numoirs & Company under the trade designation "Nomex" and from Carborundum Company under the trade designation "Kynol" respectively, may be used in place of or in addition to asbestos. As used herein, non-combustible fibers are intended to include those fibers which do not support combustions and do not lose their fibrous integrity or reinforcing capability of temperatures on the order of 1600° to 2000° F.

Since neither glass fibers in the form of a mat or blanket of $\frac{1}{2}$ to 1 inch thickness nor the resinous fire protective coating, when used alone, have been found to afford more than approximately 5 minutes protection against high temperature fires in the range of 1600° to 2000° F, it has now been discovered that an unexpected and synergistic result is obtained by combining both layers into one fire protective product in that high temperature flames may be withstood for as long as 20 minutes or more. Although the reason for this result is not fully understood, it is believed that the outer high temperature fire protective coating sufficiently dissipates the heat from the open flame and effectively minimizes the transfer of heat from the flame to the fibers so that the lower melting glass fibers of the inner layer are not subjected to temperatures sufficiently high to melt the glass until an extended period of time has elapsed. Because of the excellent insulating properties of the glass, the pipe or cable to be protected is accordingly maintained at a temperature below 200° F for an extended period of time. If, however, glass insulation itself is used unprotected by an outer covering, it quickly melts in the presence of a high temperature flame, losing much of its heat insulating properties, and in about 2 minutes or less the flame can impinge directly upon the inner cable or pipe.

On the other hand, when a fire protective coating by itself is used, because of the necessity of formulating the coating with resins, plasticizers, and fillers to provide for durability, weatherability, and ease of application, although possessing excellent self-extinguishing and fire protective properties, much of the heat insulating properties are lost. Thus, the time required for the inner conductor or pipe to reach a critical temperature where deterioration and melting may occur, which in the case of PVC is about 200° F, is in the order of 2 to 5 minutes due to the lack of heat insulating capability in the coating.

The high temperature resistant fibers are dispersed in a suitable resinous binder which may make up from 5 to about 75 weight percent of the second layer. Selection of the binder will depend upon the environment to which it is exposed, the flexibility required, i.e. wrapping, and the method by which it is to be applied. Either solvent based resins or water based emulsions may be used for this purpose. Where the glass fiber inner layer is coated with the fire protective composition and then transported to the high fire hazard area for application onto cables or pipes, either solvent or water based resins may be used. However, where it is desired to first wrap the cable or pipe with the inner glass layer and then coat with the fire protective coating in order to produce the product of this invention, the use of non-flammable water based resins for application in high fire hazard areas is desirable. Suitable resins which may be employed include polyvinyl acetate, GRS rubber, chlorinated rubber, natural rubber, methacrylate and acrylate resins and copolymers thereof, elastomeric polyurethanes, polyvinyl chloride, polyvinylidene chloride, polyvinyl chloride and polyvinylidene chloride copolymers, vinyl acetate and vinyl chloride copolymers, polyvinylacetate and ethylene copolymers epoxy resins, polystyrene and acrylontrile-butadiene-styrene polymers.

The composition of the outer layer also includes a compound which serves as a source of organically bound halogen to help impart flame retarding or self extinguishing properties to the composition. Examples of such material are halogenated hydrocarbons, particularly chlorinated abd brominated hydrocarbons with the chlorinated hydrocarbons being generally preferred because of economic considerations. Examples of such halogenated hydrocarbons include chlorinated parrafin, such as that available from Diamond Shamrock Corporation under the trade name designation "Chlorowax 70" which contains from 68 to 73 weight percent chlorine, chlorinated naphthalene, chlorinated terphenyl, mixtures of such materials, hexabromocyclodecane, tribromobenzene, polytetrafluoroethylene, chlorotrifluorethylene and perchloropentacyclodecane.

Other compounds which are suitable sources of organically bound halogen may also be used, such as tetrabromophthalic anhydride, tris (2,3dibromopropyl) phosphate, tris-B-chloroethyl phosphate, and chlorinated biphenyl. Also, if polyvinylchloride or polyvinylidene chloride is used as the resinous material, it may also serve as a suitable source of organically bound halogen. The quantity of organically bound halogen material in the dry layer may range from 1.5 to 20 weight percent, and if the resin binder also serves as the source of organically bound halogen, then it may range up to 97% of the dry film composition.

The composition will also preferably include a plasticizer to provide flexibility necessary for the wrapping of pipes and cables. The plasticizer should be compatible with the particular binder system and will usually range from 1.5 to 7.5 weight percent of the final layer. Typical plasticizers include tris-B-chloroethyl phosphate, chlorinated biphenyl, butyl benzylphthalate, dibutyl phthalate, tricresyl phosphate, triphenyl phosphate, and cresyl diphenyl phosphate.

Preferably, the outer fire protective coating also includes an antimony containing compound, such as antimonytrioxide. Generally about 1 to about 20% of antimony containing compound and preferably about 10% may be incorporated into the outer layer. The antimony compound, in combination with the organic halogen is believed to interfere with the normal combustion process so as to impart fire retardant properties. In addition to the antimony compound, the outer layer may also contain various other inorganic fillers for coloring, weatherability and fire retardancy. The quantity of such fillers in the dried coating will generally range from about 5 to about 30%. They may include calcium carbonate, zinc borate, titanium dioxide, vermiculite and asbestine, which is a mixture of talc and asbestos.

EXAMPLE 1

A coating composition was prepared by mixing approximately 26 percent of a 50 percent solids polyvinyl acetate water emulsion, about 5 percent by weight chlorinated paraffin and about 2.5 weight percent tris beta chloroethyl phosphate plasticizer with about 23 percent additional water with stirring at room temperature for approximately 15 minutes to produce a substantially uniform dispersion. Approximately 7 percent by weight of calcium carbonate filler 3.5 percent antimony trioxide were then added and mixed thoroughly for approximately 30 minutes. Approximately 27 percent by weight of asbestos fibers, consisting essentially of about 16 percent of asbestos fibers having a length of 1/32 inch or less and about 11 percent of asbestos fibers of up to approximately ½ inch in length, were then added to the emulsion and mixed thoroughly for approximately 60 minutes.

The composition was coated onto a ½ inch thick fiber glass mat to a wet film thickness of approximately ⅛ inch to give a dry film thickness of approximately 1/16 inch with a final composition of approximately:

| Resin solids | 20.25 wt.% |
| Chlorinated hydrocarbon | 7.98 wt.% |
| plasticizer | 3.99 wt.% |
| Asbestos Fibers | 39.40 wt.% |
| Inorganic Fillers | 19.06 wt.% |
| Antimony compound | 9.31 wt.% |

This insulating material was then double wrapped about electrical conduits approximately 3 inches in outside diameter and containing electrical cables having PVC insulation. A ⅛ inch wet thickness of the above composition was thereafter sprayed about the wrapped conduits.

For testing, the wrapped conduits were placed 46 inches away from a 17 foot by 20 foot burning pit containing a mixture of Bunker C Oil, gasoline and other oil refinery products.

The internal temperature of the conduit reached a temperature of 200° F only after 15 minutes exposure to flames of approximately 1600° to 2000° F. The cables after such exposure were substantially unharmed and suitable for use.

EXAMPLE II

The bottom of a cable tray was lined with a layer of fiberglass over which were layed PVC cables. The insulating material of Example I was double wrapped around the cable tray. A ⅛ inch wet thickness of the composition set forth in Example I was then sprayed about the wrapped tray. Testing as per Example I, the temperature of the tray reached 200° F after 20 minutes. The cables after such exposure were substantially unharmed and suitable for use.

Figure 4:
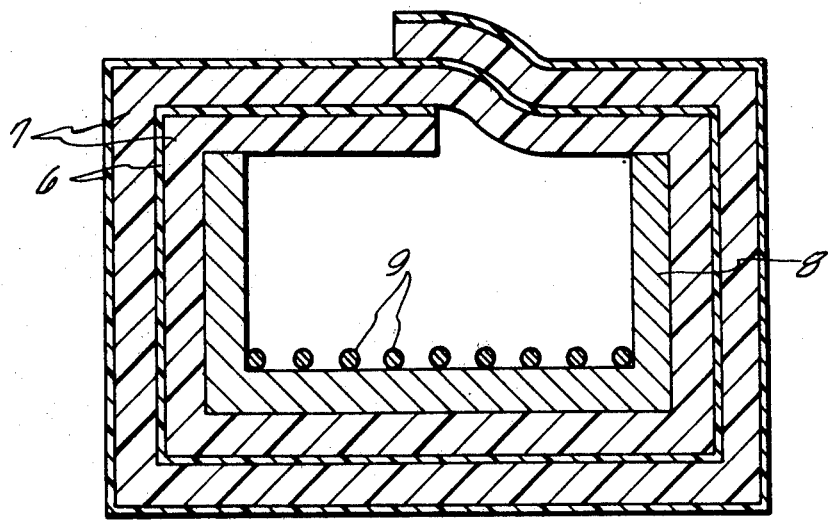
FIGS. 4 and 5 are sectional views of a cable tray with further forms of the fire protective product thereabout.
Figure 5:
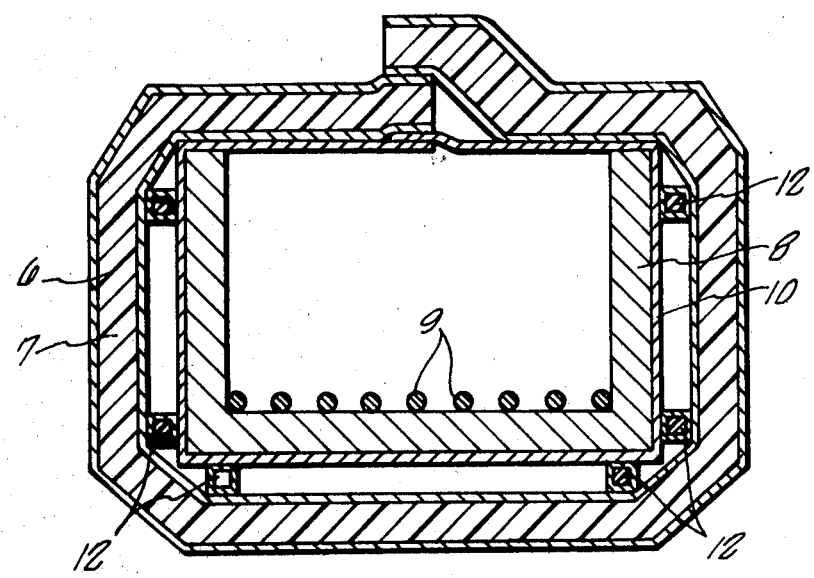

Referring now to FIGS. 4 and 5, further forms of the fire protective produce are shown. In FIG. 4, the product illustrated is similar to that shown in FIG. 3 except that a double wrap of the inner layer 7 and coating 6 is used as described previously herein, which provides for increased fire protection. In FIG. 5, a metal foil 10, e.g., aluminum, is wrapped about the cable tray 8, and spacers 12 of fiberglass mat covered with aluminum or other metal foil are positioned between the foil 10 and the outer component to provide an air space therebetween. The outer component preferably comprises aluminum or other metal foil 14 bonded by an adhesive such as a pressure sensitive adhesive to the fiberglass blanket 7 with coating 6 bonded to the opposite side as previously described. Alternatively, the inner foil 10 and spacers 12 may be omitted and the component of foil 14, fiberglass blanket 7 and coating 6 wrapped directly about cable tray 8 or conduit 3. By the same token, the foil 14 may be omitted if desired from the outer component depending upon the extent of fire protection necessary.

Having described the invention, it will be apparent to those skilled in the art that additional forms thereof may be employed and it is accordingly our intent to be limited only by the scope of the appended claims.

We claim:

1. A fire protective insulating product adapted to be placed about conduits, electrical cables, and cable trays comprising a first layer containing an insulative inorganic non-combustible glass fiber blanket and a coating bonded to said first layer along the interface with said first layer, said coating being a composition comprising about 1.5 to about 20 weight percent of organically bound halogen, about 3 to above 75 weight percent of high temperature resistant noncombustible fibers, and about 5 to about 75 weight percent of a resinous binder selection from the group consisting of natural rubber and synthetic organic resinous binders, said inorganic non-combustible glass fiber blanket having a temperature resistance substantially less than the high temperature resistant non-combustible fibers of said coating, and said fire protective insulating product having a minimum thickness of said glass fiber blanket of approximately ¼ inch.

2. The fire protective insulating material of claim 1 wherein said non-combustible fiber of said coating is asbestos.

3. The fire protective insulating material of claim 1 wherein the organically bound halogen is selected from the group consisting of halogenated hydrocarbons, tetrabromophthalic anhydride, tris (2,3 dibromopropyl) phosphate, tris beta chloroethyl phosphate and chlorinated biphenyl.

4. The fire protective insulating material of claim 1 wherein the binder is selected from the group consisting of polyvinyl acetate, GRS rubber, chlorinated rubber, natural rubber, methacrylate and acrylate resins and copolymers thereof, elastomeric polyurethanes, polyvinyl chloride, polyvinylidene chloride, polyvinyl chloride and polyvinylidene chloride copolymers, vinylacetate and vinyl chloride copolymers, polyvinylacetate and ethylene copolymers, epoxy resins, polystyrene and acrylonytrile-butadiene-styrene polymers.

5. The fire protective insulating material of claim 1 wherein said coating contains from about 0.5 to about 20 weight percent of an antimony containing compound.

6. The fire protective insulating product of claim 1 wherein said first layer contains a pressure sensitive adhesive on the surface opposite the surface having said coating contiguous thereto whereby said material may be used as a fire protective tape.

7. The fire protective insulating product of claim 1 in which said fiberglass blanket has a metal foil bonded thereto on the side opposite from said coating and adapted to be in contact with suh conduit, cables or cable tray.

8. A fire protective insulating product adapted to be placed about conduits, electrical cables, and cable trays, comprising a first blanket layer containing glass fibers and a coating bonded to said first layer along the interface with said first layer being a composition containing about 3 to about 75 weight percent of high temperature resistant noncombustible fibers, about 1.5 to about 20 weight percent of organically bound halogen selected from the group consisting of halogenated hydrocarbons, tetrabromophthalic anhydride, tris-B-chloroethyl phosphate, chlorinated biphenyl, chlorinated terphenyl and mixtures thereof, about 5 to about 75 weight percent of a resinous binder selected from the group consisting of polyvinyl acetate emulsion, GRS rubber, natural rubber latex, methacrylate and acrylate resins and copolymers thereof, elastomeric polyurethanes, polyvinyl chloride, polyvinylidene chloride, polyvinyl chloride and polyvinylidene chloride copolymers, vinylacetate and vinyl chloride copolymers, polyvinylacetate and ethylene copolymers, water emulsified epoxy resins, polystyrene and acrylontrile-butadiene-styrene polymers, and about 1.0 to about 20 weight percent of an antimony containing compound, said fire protective insulating product having a minimum thickness of said blanket of approximately ¼ inch.

9. A fire resistant construction comprising a conduit, electrical cable or cable tray covered by a first layer containing an inorganic non-combustible glass fiber blanket and a coating bonded to said first layer along the interface with said first layer being a composition comprising about 1.5 to about 20 weight percent of organically bound halogen, about 3 to about 75 weight percent high temperature resistant non-combustible figers and about 5 to 75 weight percent of a resinous binder selected from the group consisting of natural rubber and synthetic organic resinous binders, said inorganic non-combustible glass fibers having a temperature resistance substantially less than the high temperature resistant non-combustible fibers of said coating, and said fire resistance construction having a minimum thickness of said glass fiber blanket of approximately ¼ inch.

10. The fire resistant construction of claim 9 wherein said high temperature resistant non-combustible fiber of said coating is asbestos.

11. The fire resistant construction of claim 9 wherein the organically bound halogen is selected from the group consisting of halogenated hydrocarbons, tetrabromphthalic anhydride, tris (2,3 dibromopropyl) phosphate, tris-B-chloroethyl phosphate and chlorinated biphenyl.

12. The fire resistant construction of claim 9 wherein the binder is selected from the group consisting of polyvinyl acetate, GRS rubber, chlorinated rubber, natural rubber, methacrylate and acrylate resins and copolymers thereof, elastomeric polyurethanes, polyvinyl chloride, polyvinylidene chloride, polyvinyl chloride and polyvinylidene chloride copolymers, vinylacetate and vinyl chloride copolymers, polyvinylacetate and ethylene copolymers, epoxy resins, polystyrene and acrylonytrile-butadiene-styrene polymers.

13. The fire resistant construction of claim 9 wherein said coating contains from about 0.5 to about 20 weight percent of an antimony containing compound.

14. The fire protective insulating construction of claim 9 in which an aluminum foil is positioned about said conduit, cable, or cable tray, spacers of fiberglass mat covered with aluminum foil are positioned adjacent said foil, and said inorganic non-combustible glass fiber blanket has a metal foil bonded thereto on the side opposite said coating, whereby an air space is provided between said aluminum foil positioned about conduit, cable or cable tray and said metal foil bonded to said glass fiber blanket.

15. A fire resistnat construction comprising a conduit, electrical cable or cable tray covered by a first blanket layer containing glass fibers and a coating bonded to said first layer along the interface with said first layer being a composition containing about 3 to about 75 weight percent of asbestos fibers, about 1.5 to about 20 weight percent of organically bound halogen selected from the group consisting of halogenated hydrocarbons, tetrabromophthalic anhydride, tris (2,3 dibromopropyl) phosphate, tris-B-chloroethyl phosphate, chlorindated biphenyl, chlorinated terphenyl and mixture thereof, about 5 to 75 weight percent of a suitable binder selected from the group consisting of polyvinyl acetate emulsions, GRS rubber, natural rubber latex, methacrylate and acrylate resins and copolymers thereof, elastomeric polyurethanes, polyvinyl chloride, polyvinylidene chloride, polyvinyl chloride and polyvinlidene chloride copolymers, vinylacetate and vinylchloride copolymers, polyvinylacetate and ethylene copolymers, water emulsified epoxy resins, polystyrene and acrylonitrile-butadiene-styrene polymers, and about 1.0 to about 20 weight percent of an antimony containing compound, said blanket containing glass fibers having a temperature resistance substantially less than the temperature of said asbestos fibers of said coating, and said fire resistant construction having a minimum thickness of said blanket of approximately ½ inch.

16. A fire protective insulating product comprising a first layer containing an insulative inorganic molded fiberglass part and a coating bonded to said molded fiberglass part along the interface therewith being a composition comprising about 1.5 to about 20 weight percent of organically bound halogen, about 3 to about 75 weight percent of high temperature resistant noncombustible fibers, and about 5 to about 75 weight percent of a resinous binder selected from the group consisting of natural rubber and synthetic organic resinous binders, said fiberglass of said molded fiberglass part having a temperature resistance substantially less than the high temperature resistance substantially less than the high temperature resistant non-combustible fibers of said coating, and said fire protective insulating product having a minimum thickness of fiberglass of approximately ½ inch.

* * * * *